(12) United States Patent
Stauder et al.

(10) Patent No.: US 7,388,367 B2
(45) Date of Patent: Jun. 17, 2008

(54) METHOD FOR DETERMINING THE ROTOR POSITION OF A SYNCHRONOUS MACHINE

(75) Inventors: Peter Stauder, Mainz (DE); Tom Kaufmann, Winterbach (DE)

(73) Assignee: Continental Teves AG & Co. OHG

( * ) Notice: Subject to any disclaimer, the term of this patent is extended or adjusted under 35 U.S.C. 154(b) by 0 days.

(21) Appl. No.: 10/578,560

(22) PCT Filed: Oct. 28, 2004

(86) PCT No.: PCT/EP2004/052702

§ 371 (c)(1),
(2), (4) Date: Feb. 26, 2007

(87) PCT Pub. No.: WO2005/046043

PCT Pub. Date: May 19, 2005

(65) Prior Publication Data

US 2007/0252587 A1 Nov. 1, 2007

(30) Foreign Application Priority Data

Nov. 6, 2003 (DE) ................................ 103 51 850

(51) Int. Cl.
*G01B 7/30* (2006.01)
(52) U.S. Cl. .............................. 324/207.25; 324/207.15; 310/68 B
(58) Field of Classification Search ............ 324/207.25, 324/207.12, 207.15, 234, 239, 257–258; 318/700, 768, 715, 718, 798–799; 310/40 R, 310/68 B, 68 C; 73/514.31, 514.39
See application file for complete search history.

(56) References Cited

U.S. PATENT DOCUMENTS 6,172,498 B1    1/2001  Schmidt et al.

FOREIGN PATENT DOCUMENTS

| AT | 395487 | 1/1993 |
|----|--------|--------|
| EP | 0793337 | 9/1997 |
| EP | 1160966 | 12/2001 |

*Primary Examiner*—Bot LeDynh

(57) ABSTRACT

The invention relates to a method for determining the rotor position of a stationary or slowly rotating synchronous machine by evaluating electrical test pulses that are obtained by applying voltage pulses to the individual phase windings of the stator, wherein changes in the inductance of the phase windings which are caused by saturation of the stator iron depending on the rotor position, are determined in opposite directions or current by calculating differences in the amount of current of two test pulses, and angle values being predetermined by the number of the phase windings are associated with the differences in the amount of current.

To enhance the measuring accuracy of the method, the invention provides that prior to the first test pulse $I_{meas1}$, a bias pulse $I_{bias}$ whose polarity is inverted in relation to the first pulse $I_{meas1}$ is generated, with the switch-on times $t_1$ of the associated voltage pulses $U_{bias}$ and $-U_{meas1}$ being equal, and in that the respectively first test pulse $I_{meas1}$ generated in the corresponding phase winding (U, V, W) acts as a bias pulse in the same phase winding (U, V, W).

17 Claims, 3 Drawing Sheets

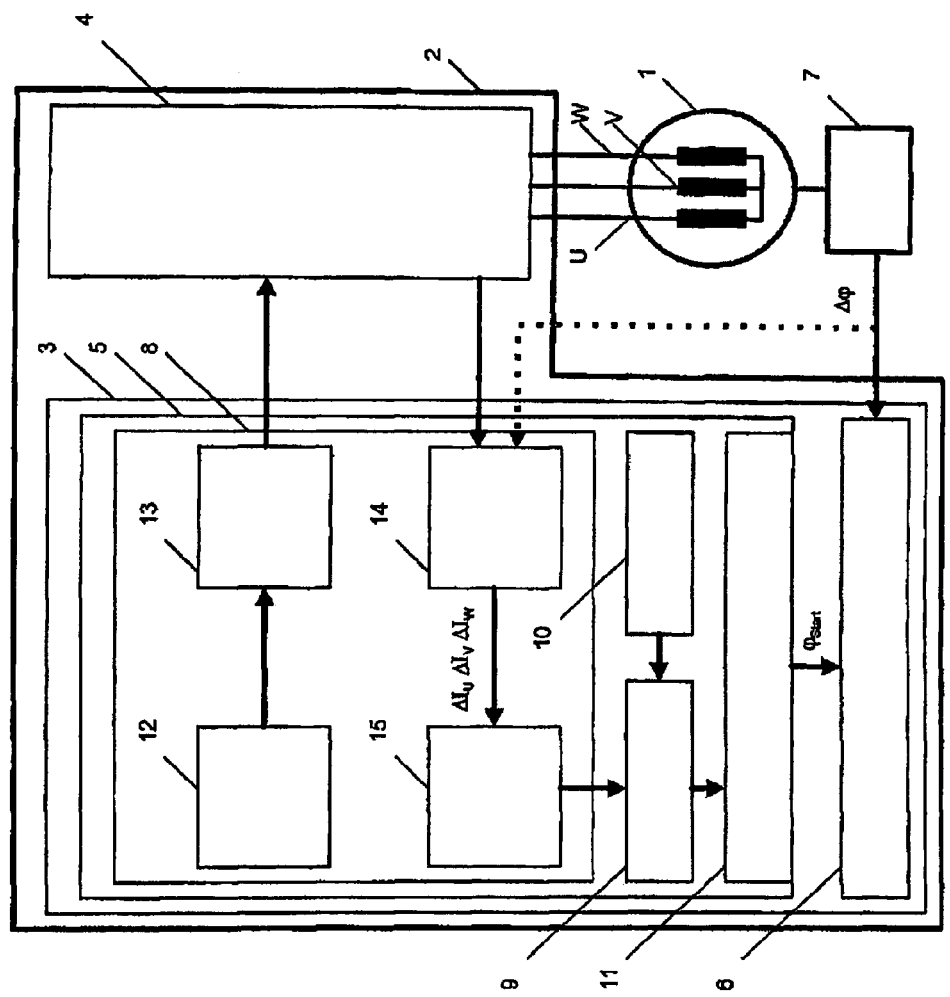

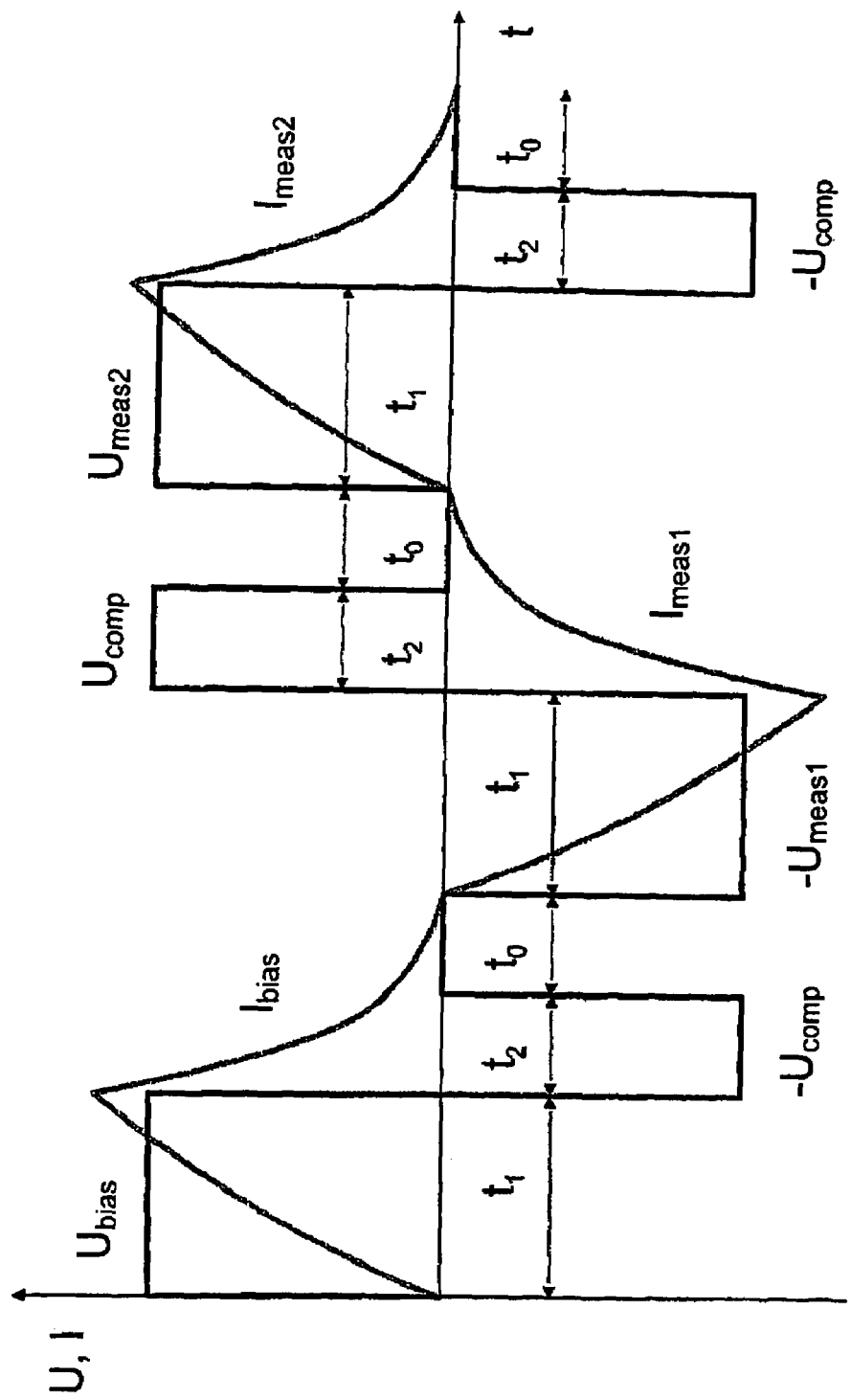

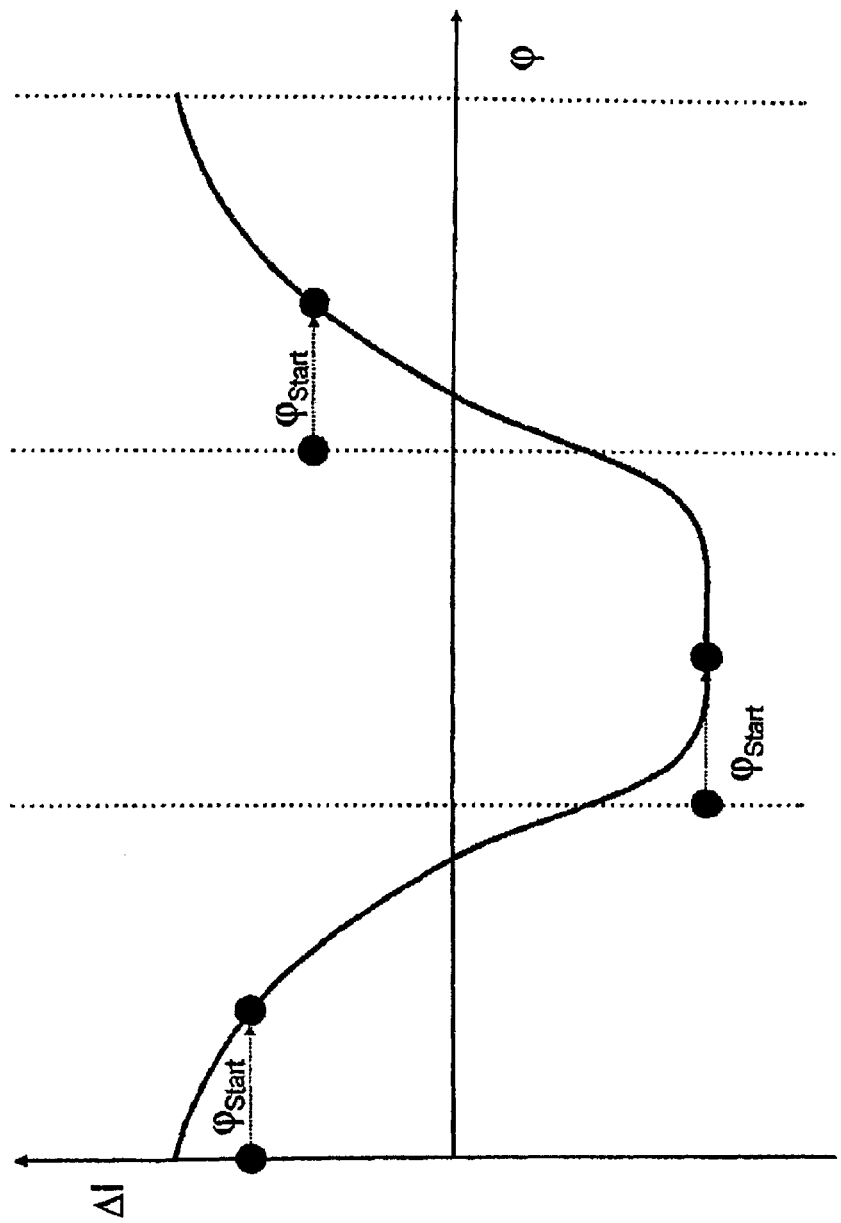

METHOD FOR DETERMINING THE ROTOR POSITION OF A SYNCHRONOUS MACHINE

BACKGROUND OF THE INVENTION

The present invention relates to a method for determining the rotor position of a stationary or slowly rotating synchronous machine by evaluating electrical test pulses that are obtained by applying voltage pulses to the individual phase windings of the stator, wherein changes in the inductance of the phase windings which are caused by saturation of the stator iron depending on the rotor position, are determined in opposite directions of current by calculating differences in the amount of current of two test pulses, and angle values being predetermined by the number of the phase windings are associated with the differences in the amount of current.

A method of this type is e.g. disclosed in U.S. Pat. No. 6,172,498 B1 being titled 'Method and Apparatus for Rotor Angle Detection'. When the prior art method is implemented, test pulses of opposite polarity are applied to the individual phase windings of the stator, and difference values are produced from the pulses' amplitudes which are used to determine the general rotor position and, subsequently, to determine a correction value used to correct the general rotor position.

It is disadvantageous in this method that the residual magnetism of the stator iron being induced by the test pulses influences in each case the following test pulse so that the initial rotor position is not determined with a sufficient rate of accuracy, with the result that the measuring accuracy of the method is highly impaired.

SUMMARY OF THE INVENTION

An object of the invention is to enhance the measuring accuracy of the method of the type mentioned hereinabove.

According to the invention, this object is achieved in that prior to the first test pulse, a bias pulse whose polarity is inverted in relation to the first pulse and whose switch-on time corresponds to the first test pulse is generated, and that the respectively first test pulse applied to the corresponding phase winding acts as a bias pulse in the same phase winding.

In a favorable improvement of the method of the invention, defined angle offset values are added to angle values being associated with the differences in the amount of current when the test pulses are evaluated, and the so produced pairs of values are compared with a reference characteristic curve, and the sum of the squares of the comparison results is produced and stored together with the associated angle offset value in a memory, whereupon the minimum of the sum is established and the associated angle offset value is issued as the measured rotor position. This provision achieves a further increase in the accuracy of the established rotor position by way of evaluating the reference characteristic curve which precisely reflects the characteristics of a reference machine.

It is arranged for in another favorable improvement of the invention that the angle offset values are limited to an angular range being defined by signs of the established differences in the amount of current. This provision achieves an increase in the speed of evaluation or a reduction of the necessary calculating capacity by way of a pre-selection of the result to be expected.

In order to achieve an increase in the speed of evaluation or a reduction of the necessary calculating capacity by an iterative refinement of the resolution of the rotor position to be established, the invention provides that several cycles of evaluation be performed consecutively with decreasing distances between the angle offset values.

In order to minimize a moment reaction of the test pulses to the rotor position by way of an active current reduction and to reduce the time of measurement, it is arranged for according to an additional feature of the invention that one or more compensation pulses are generated in order to increase the current decline gradient of the biasing pulse and the test pulses.

As this occurs, preferably two or more phase windings can be connected with defined potentials for a fixed time in order to generate a test pulse, or one or more phase windings and the star point can be connected with defined potentials for a fixed time, which holds especially true with motors having a star connection. The measuring accuracy is considerably enhanced by gaining further measuring points with additional angle values. If different inductances and resistances ensue from the additional angle values for the corresponding circuit configuration, the switch-on time of the test pulses must be adapted and/or the established differences of the amount of current must be multiplied with a scaling factor.

To increase the accuracy of the rotor position determination by an optimal utilization of the available range of current measurement, according to the invention, the fixed time is chosen depending on the voltage necessary to produce the test pulses and applied to the phase windings. In addition, the fixed time can be chosen depending on the temperature of the synchronous machine. This provision achieves an additional increase in the accuracy of the determined rotor position by a compensation of the change in resistance of the phase windings under temperature influences.

Should it be impossible to measure voltages and/or temperatures, the measuring accuracy is further increased by an optimal utilization of the available range of current measurement because the fixed time is gradually extended until a desired current amplitude of the test pulse is reached.

In another variant of the method of the invention which can be implemented in a particularly low-cost manner, the current amplitude of all test pulses is established using one single means of measurement. The omission of the measurement offset in the subtraction and the omission of scaling errors when several sensors are used allows enhancing the accuracy of the rotor position determination. Only one additional sensor is required to choose a range of current measurement which is optimal for the rotor position determination.

Alternatively, the current amplitude of all test pulses can be determined with a current measuring device which is associated with the synchronous machine, thereby obviating the need for additional sensors.

To further increase the accuracy of the detected rotor position by considering the measured change of the rotor position during the measurement, a favorable improvement of the subject matter of the invention provides that the change in the rotor position due to the moment reaction of the test pulses is measured, and the angle values associated with the differences of the amount of current are corrected accordingly in dependence on the measurement.

In another advantageous improvement of the method of the invention, the reference characteristic curve is adapted to the detected differences of the amount of current, with the result of achieving an adaptation of the reference characteristic curve to the characteristics of the synchronous machine in order to compensate series variations in manufacture.

According to another favorable feature of the invention, the voltage applied to the phase windings is monitored during the test pulses, and the test pulse is repeated in the event of a deviation from a predetermined tolerance. This provision is used to reject all test pulses which are corrupted by voltage sags.

In another variant of the method of the invention, it is provided that the current amplitude of the test pulses is monitored during their switch-on time and that the test pulse is repeated in the event of a deviation from a predetermined tolerance. This provision is used to reject all test pulses lying outside the tolerance.

Finally, according to another feature of the invention, the minimum of the sum of the squares of the comparison results is used as a criterion of the quality of the determination of the rotor position. Due to this provision all rotor position values are dismissed whose basic differences of the amount of current differ excessively from the stored reference characteristic curve.

BRIEF DESCRIPTION OF THE DRAWINGS

To explain the invention more closely, reference is made to the drawings in which one embodiment of the method of the invention for determining the rotor position is schematically illustrated. In the accompanying drawings:

FIG. 1 is a block diagram showing a device for implementing the generic method;

FIG. 2 is a diagram of the dependency U, I=f(t) showing voltage pulses and current pulses of an idealized individual measurement in a favorable embodiment of the method of the invention, and FIG. 3 is a diagram illustrating the evaluation of the test pulses.

DETAILED DESCRIPTION OF THE DRAWINGS

Referring to FIG. 1, reference numeral 1 designates a synchronous machine, and reference numeral 2 designates an actuation electronic unit associated with the synchronous machine 1. The actuation electronic unit 2 essentially comprises an actuation software module 3 and an output end stage 4, the output or voltage signals $U_U$, $U_V$ and $U_W$ of which are applied to the phase windings U, V and W of the synchronous machine 1. The actuation software module 3 comprises a control module 5 for controlling the process of determining the rotor position of the synchronous machine 1 as well as a rotor position detection device 6 to which are sent output signals $\Delta\phi$ of a relative rotor position sensor 7, which reflect the change in the rotor position of the synchronous machine 1. The control module 5 comprises a test-value detection module 8, an evaluating module 9, a memory 10 in which a reference characteristic curve of the synchronous machine 1 is stored, as well as an interface 11 whose output signal is sent to the rotor position detection device 6. The test-value detection module 8 is basically comprised of a test pulse generator 12, a PWM unit 13 connected downstream of the test pulse generator 12, a measuring device 14, and a test value memory 15.

The mode of function of the circuit configuration illustrated in FIG. 1 will be explained in detail in the following text:

It shall be assumed that the synchronous machine 1 adopts a position of standstill, and initially the difference of the amount of current in the phase winding U is measured. To do so, a first potential is applied to the phase winding U, while a second potential is applied to the phase windings V and W. The switch-on time of the voltage thus developing is fixed by the test pulse generator 12. The PWM unit 14 puts the requirements of the test pulse generator 12 into practice by actuating the output end stage 4 in such a fashion that the desired voltage pulses are applied to the phase windings U, V, W of the synchronous machine 1. The application of the voltage pulse $U_{bias}$ induces a current pulse $I_{bias}$ in the phase winding U (see FIG. 2), which is used as a bias pulse and brings about a defined residual magnetization or remanence in the stator iron. To speed up the current reduction, a compensation voltage pulse $-U_{comp}$ of a shorter switch-on time $t_2$ and inverted polarity is produced by the test pulse generator 12. Subsequent to the compensation pulse $-U_{comp}$ may be a waiting time to during which the current decays to zero. Following this step, a voltage pulse $-U_{meas1}$ with a polarity that corresponds to the preceding compensation pulse $-U_{comp}$ is generated by the test pulse generator 12, having a switch-on time which corresponds to the switch-on time $t_1$ of the voltage pulse $U_{bias}$ for generating the biasing pulse $I_{bias}$ and producing a first current measuring pulse $I_{meas1}$ whose amount amplitude is determined at the end of the voltage pulse $-U_{meas1}$ in the measuring device 14. A compensation voltage pulse $U_{comp}$ is again used for the purpose of current reduction. Subsequently, a second current measuring pulse $I_{meas2}$ with an inverted polarity is generated in the same manner, whose amount amplitude is also determined by the measuring device 14. A difference in the amount of current $\Delta I_U$ is produced from the detected amount amplitudes in the measuring device 14 and is stored with the associated angle value in the measured value memory 15. The described measuring operation is repeated also for the phase windings V and W.

In a next step, the pairs of values produced from the differences of the amount of current $\Delta I$ and the associated angle values are sent to the evaluating module 9 in which they are compared with the reference characteristic curve stored in memory 10. As is illustrated in FIG. 3, the pairs of values are shifted by an appropriate angle offset value $\phi_{Start}$ in such a fashion that the deviation from the reference characteristic curve is minimized. The per se known method of the minimum error squares is preferably used for this purpose. The angle offset value $\phi_{Start}$ is transmitted via the interface 11 to the rotor position detection unit 6 and used by this unit as a starting angle of the synchronous machine 1. For the operation of the synchronous machine 1, the rotor position detection unit 6 continuously adds the rotor position variation $\Delta\phi$ to the starting angle $\phi_{Start}$.

The invention claimed is:

1. A method for determining a rotor position of a stationary or slowly rotating synchronous machine, the method comprising:

evaluating electrical test pulses that are obtained by applying voltage pulses to the individual phase windings of the stator, wherein changes in the inductance of the phase windings which are caused by saturation of a stator iron depending on the rotor position, are determined in opposite directions of current by calculating differences in an amount of current of two test pulses, and angle values being predetermined by a number of the phase windings are associated with the differences in the amount of current, wherein prior to the first test pulse $I_{meas1}$, a bias pulse $I_{bias}$ whose polarity is inverted in relation to the first pulse $I_{meas1}$ is generated, with the switch-on times $t_1$ of the associated voltage pulses $U_{bias}$ and $-U_{meas1}$ being equal, and in that the respectively first test pulse $I_{meas1}$ generated in the corresponding phase winding (U, V, W) acts as a bias pulse in the same phase winding (U, V, W).

2. The method according to claim 1, wherein defined angle offset values are added to angle values being associated with the differences in the amount of current $\Delta I$ when the test pulses $I_{meas}$ are evaluated, and the so produced pairs of values are compared with a reference characteristic curve, and the sum of the squares of the comparison results is produced and stored together with the associated angle offset value in a memory, whereupon the minimum of the sum is determined and the associated angle offset value $\phi_{start}$ is issued as the measured rotor position.

3. The method according to claim 2, wherein the angle offset values are limited to an angular range being defined by the evaluation of the signs of the established differences in the amount of current.

4. The method according to claim 2, wherein several cycles of evaluation are performed consecutively with decreasing distances between the angle values.

5. The method according to claim 2, wherein the reference characteristic curve is adapted to the detected differences of the amount of current.

6. The method according to claim 1, wherein the minimum of the sum of the squares of the comparison results is used as a criterion of the quality of the determination of the rotor position.

7. The method according to claim 1, wherein one or more compensation pulses $U_{comp}$ are generated in order to increase the current decline gradient of the biasing pulse $I_{bias}$ and the test pulses $I_{meas}$.

8. The method according to claim 1, wherein two or more phase windings are connected with defined potentials for a fixed time $t_1$ in order to generate a test pulse $I_{meas}$.

9. The according to claim 1, wherein in order to generate a test pulse $I_{meas}$ in motors having a star connection, one or more phase windings and a star point are connected with defined potentials for a fixed time $t_1$.

10. The method according to claim 9, wherein the fixed time $t_1$ is chosen depending on the voltage $U_{meas}$ necessary to produce the test pulses $I_{meas}$ and applied to the phase windings.

11. The method according to claim 9, wherein the fixed time $t_1$ is chosen depending on a temperature of the synchronous machine 1.

12. The method according to claim 9, wherein the fixed time $t_1$ is gradually extended until a desired current amplitude of the test pulse $I_{meas}$ is reached.

13. The method according to claim 1, wherein the current amplitude of all test pulses $I_{meas}$ is determined using one single means of measurement.

14. The method according to claim 1, wherein a current measuring device serving to determine the current amplitude of all test pulses $I_{meas}$ is associated with the synchronous machine (1).

15. The method according to claim 14, wherein the change in the rotor position due to the moment reaction of the test pulses $I_{meas}$ is measured, and the angle values associated with the differences of the amount of current are corrected depending on the measurement.

16. The method according to claim 1, wherein the voltage applied to the phase windings is monitored during the switch-on time $t_1$ of the voltage pulses $U_{meas}$, and the test pulse $I_{meas}$ is repeated in the event of a deviation from a predetermined tolerance.

17. The method according to claim 1, wherein the current amplitude $I_{meas}$ of the voltage pulses $U_{meas}$ is monitored during their switch-on time $t_1$, and that the test pulse $I_{meas}$ is repeated in the event of a deviation from a predetermined tolerance.

* * * * *